United States Patent [19]

Fishwick et al.

[11] 4,139,528
[45] Feb. 13, 1979

[54] WATER-INSOLUBLE MONOAZO DYESTUFFS WHICH IS A DIAZOTIZED 6-CYANO-2:4-DINITROANILINE COUPLED TO A M-ACYLAMINO-SUBSTITUTED ANILINE

[75] Inventors: Brian R. Fishwick; Arthur Quayle, both of Manchester, England

[73] Assignee: Imperial Chemical Industries Limited, London, England

[21] Appl. No.: 678,630

[22] Filed: Apr. 20, 1976

Related U.S. Application Data

[63] Continuation-in-part of Ser. No. 385,705, Aug. 6, 1973, abandoned, which is a continuation-in-part of Ser. No. 229,550, Feb. 25, 1972, abandoned.

[30] Foreign Application Priority Data

Mar. 2, 1971 [GB] United Kingdom .................. 5794/71

[51] Int. Cl.² ............................................. C09B 29/08
[52] U.S. Cl. ................................................... 260/207.1
[58] Field of Search .................. 260/207.1, 207, 207.5

[56] References Cited

U.S. PATENT DOCUMENTS

| | | | |
|---|---|---|---|
| 2,155,755 | 4/1939 | Felix et al. | 260/207 |
| 3,503,955 | 3/1970 | Genta | 260/207.1 X |
| 3,522,234 | 7/1970 | Groebke | 260/207 |
| 3,637,651 | 1/1972 | Baron et al. | 260/207.1 X |
| 3,968,099 | 7/1976 | Leuerenz | 260/207.1 |

FOREIGN PATENT DOCUMENTS

| | | | |
|---|---|---|---|
| 741331 | 8/1966 | Canada | 260/207.1 |
| 2210143 | 9/1972 | Fed. Rep. of Germany | 260/207.1 |
| 44-24710 | 10/1969 | Japan | 260/207.1 |
| 855715 | 12/1960 | United Kingdom | 260/207.5 |

*Primary Examiner*—Charles F. Warren
*Attorney, Agent, or Firm*—Cushman, Darby & Cushman

[57] ABSTRACT

Water-insoluble monoazo dyestuffs of the formula

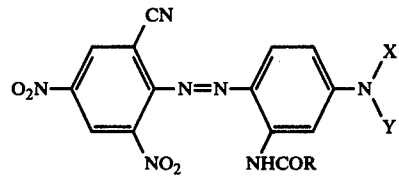

wherein R is optionally substituted lower alkyl or phenyl, X is β-hydroxyethyl or γ-chloro-β-hydroxypropyl, and Y is lower alkyl, a process for the manufacture of the said dyestuffs and their use for coloring synthetic textile materials in particular aromatic polyester textile materials.

2 Claims, No Drawings

WATER-INSOLUBLE MONOAZO DYESTUFFS WHICH IS A DIAZOTIZED 6-CYANO-2:4-DINITROANILINE COUPLED TO A M-ACYLAMINO-SUBSTITUTED ANILINE

This application is a continuation-in-part of application Ser. No. 385,705 which was filed in the U.S. Patent Office on 6th August 1973, now abandoned, and which itself was a continuation-in-part of application Ser. No. 229,550, now abandoned, which was filed in the U.S. Patent Office on 25th February 1972.

This invention relates to water-insoluble monoazo dyestuffs which are valuable for colouring synthetic textile materials, in particular aromatic polyester textile materials.

According to the invention there are provided the water-insoluble monoazo dyestuffs free from carboxylic acid and sulphonic acid groups which are of the formula:

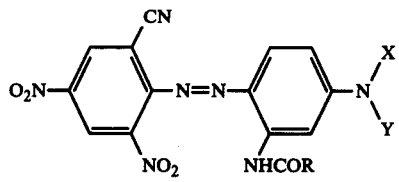

wherein X is a β-hydroxyethyl or γ-chloro-β-hydroxypropyl radical Y is lower alkyl and R is lower alkyl, chloro lower alkyl, phenyl or tolyl.

Throughout this specification the term "lower alkyl" is used to denote alkyl containing from 1 to 4 carbon atoms.

As examples of lower alkyl represented by Y and R there may be mentioned methyl, ethyl, n-propyl and n-butyl. As examples of chloro lower alkyl represented by R there may be mentioned β-chloroethyl and β- or γ-chloropropyl.

A preferred class of the dyestuffs of the invention comprises the dyestuffs wherein R is a lower alkyl radical, in particular the methyl radical.

It is further preferred that X is β-hydroxyethyl.

According to a further feature of the invention there is provided a process for the manufacture of the dyestuffs of the invention which comprises coupling diazotised 6-cyano-2:4-dinitroaniline with a coupling component of the formula:

wherein R, X and Y have the meanings stated, the coupling component being free from carboxylic acid groups.

The process of the invention can be conveniently carried out by diazotising 6-cyano-2:4-dinitroaniline in conventional manner, for example by adding the amine to a solution of nitrosulsulphuric acid in sulphuric acid, and adding the resulting solution or suspension of the diazo compound to a solution or suspension of the coupling component in water optionally containing a water-soluble organic liquid and/or acid, if necessary adjusting the pH of the resulting mixture so as to facilitate the coupling reaction, and isolating the dyestuff which is formed in conventional manner.

The said coupling components can themselves be obtained by reacting the appropriate m-acylaminoaniline or an N-lower alkyl derivative thereof with β-chloroethanol or with epichlorohydrin of firstly with β-chloroethanol and then with epichlorohydrin. As examples of the said coupling components there may be mentioned 3-acetylamino-N-(methyl, ethyl, n-propyl or n-butyl)-N-(β-hydroxyethyl or γ-chloro-β-hydroxypropyl)aniline.

The monoazo dyestuffs of the invention are valuable for colouring aromatic polyester textile materials in particular polyethylene terephthalate textile materials. Such materials can be in the form of filaments, fibres or woven or knitted materials.

The monoazo dyestuffs can be applied to aromatic polyester textile materials by the methods which are conventionally employed in applying disperse dyestuffs to such textile materials. Thus, for example, the said textile materials can be immersed in a dyebath containing an aqueous dispersion of one or more of the said dyestuffs and dyeing then carried out at a temperature in the region of 100° C., the dyebath additionally containing a carrier such as diphenyl, o-hydroxydiphenyl or methylnaphthalene. Alternatively dyeing can be carried out at a temperature above 100° C., preferably at a temperature between 120° C. and 140° C., under superatmospheric pressure when a carrier is not necessary. Alternatively the said textile materials can be padded or printed with an aqueous padding liquor or printing paste containing one or more of the said dyestuff, the padded or printed material is dried, and is then given a steaming treatment or a baking treatment, for example baking for a short period at a temperature of between 150° and 220° C.

If desired the monoazo dyestuffs of the invention can be applied in conjunction with other disperse dyestuffs which are conventionally employed for colouring aromatic polyester textile materials; for example the disperse dyestuffs which are described in the third edition of the Colour Index (1971).

When applied to aromatic polyester textile materials the monoazo dyestuffs of the invention yield blue shades which have excellent fastness to light, to wet treatments and in particular to dry heat treatments. The dyestuffs of the invention also have excellent build-up properties on aromatic polyester textile materials so that heavy depths of shade can be readily obtained.

The dyestuffs of the invention are of particular value for colouring aromatic polyester textile materials by the "Thermosol" process and in particular for colouring polyester/cotton unions by this process, since although the polyester portion of the union can be coloured to heavy depths of shade there is little or not staining of the cotton portion of the union. In the "Thermosol" process an aqueous padding liquor is applied to the textile material which is dried and is then baked at temperatures between 150° and 200° C.

The dyestuffs of the invention can also be applied to aromatic polyester textile materials by solvent dyeing methods. The dyestuffs of the invention are also valuable for colouring other synthetic textile materials such as cellulose acetate textile materials and polyamide textile materials such as those made from Nylon 6 and Nylon 6:6 polymers. The said dyestuffs dye polyamide textile materials in blue shades having excellent fastness to the wet treatments commonly applied to such textile materials.

EXAMPLE 1

2.08 Parts of 6-cyano-2:4-dinitroaniline are added during 30 minutes to a solution of nitrosylsulphuric acid and maintained below 2° C. which had been prepared by dissolving 0.7 part of sodium nitrite in 5 parts of sulphuric acid. The mixture is stirred for 1 hour at a temperature below 2° C., 100 parts of ortho-phosphuric acid are added over 2 hours at a temperature of −5° C. to −2° C. and the mixture stirred for a further hour. The resulting solution of the diazo compound is then added to a solution of 2.5 parts of 3-acetylamino-N-butyl-N-(β-hydroxyethyl) aniline in 100 parts of a 0.2N aqueous solution of hydrochloric acid at 5° C., and the mixture stirred for a further hour. The precipitated dyestuff is then filtered off, washed with water and dried.

When dispersed in aqueous medium the dyestuff dyes aromatic polyester textile materials in blue shades having excellent fastness to light and to dry heat treatments. The dyestuff has excellent affinity and build-up properties so that heavy depths of shade can be obtained.

When an aqueous padding liquor containing the dyestuff in disperse form is applied to a polyester/cotton union, which is dried and then baked for 1 minute at 200° C. a deep blue shade is obtained on the polyester portion of the union while there is excellent reserve of the cotton

EXAMPLE 2

In place of the 2.5 parts of 3-acetylamino-N-butyl-N-(β-hydroxyethyl)aniline used in Example 1 there are used equivalent amounts of the following coupling components:

(a) 3-acetylamino-N-ethyl-N-(β-hydroxyethyl)aniline,
(b) 3-propionylamino-N-ethyl-N-(γ-chloro-β-hydroxypropyl)aniline,
(c) 3-(β-chloropropionylamino)-N-methyl-N-(β-hydroxyethyl)aniline,
(d) 3-benzoylamino-N-ethyl-N-(β-hydroxyethyl)aniline,
(e) 3-p-toluoylamino-N-ethyl-N-(β-hydroxyethyl)aniline,
(f) 3-acetylamino-N-methyl-N-(β-hydroxyethyl)aniline,
(g) 3-acetylamino-N-propyl-N-(β-hydroxyethyl)aniline
(h) 3-acetylamino-N-isopropyl-N-(β-hydroxyethyl)aniline,
(j) 3-propionylamino-N-methyl-N-(β-hydroxyethyl)aniline,
(k) 3-propionylamino-N-ethyl-N-(β-hydroxyethyl)aniline,
(l) 3-propionylamino-N-n-propyl-N-(β-hydroxyethyl)aniline,
(m) 3-propionylamino-N-n-butyl-N-(β-hydroxyethyl)aniline,
(n) 3-propionylamino-N-isobutyl-N-(β-hydroxyethyl)aniline,
(p) 3-n-butyrylamino-N-ethyl-N-(β-hydroxyethyl)aniline,
(q) 3-n-butyrylamino-N-n-butyl-N-(β-hydroxyethyl)aniline,
(r) 3-isobutyrylamino-N-ethyl-N-(β-hydroxyethyl)aniline,
(s) 3-n-butylcarbonylamino-N-ethyl-N-(β-hydroxyethyl)aniline,
(t) 3-n-butylcarbonylamino-N-n-butyl-N-(β-hydroxyethyl)aniline,
(u) 3-tert-butylcarbonylamino-N-ethyl-N-(β-hydroxyethyl)aniline,
(v) 3-(β-chloropropionylamino)-N-n-butyl-N-(β-hydroxyethyl)aniline,
(w) 3-benzoylamino-N-n-butyl-N-(β-hydroxyethyl)aniline,
(x) 3-p-toluoylamino-N-methyl-N-(β-hydroxyethyl)aniline,
(y) 3-o-toluoylamino-N-n-propyl-N-(β-hydroxyethyl)aniline,
(z) 3-m-toluoylamino-N-n-butyl-N-(β-hydroxyethyl)aniline,
(aa) 3-acetylamino-N-ethyl-N-(γ-chloro-β-hydroxypropyl)aniline,
(ab) 3-acetylamino-N-n-butyl-N-(γ-chloro-β-hydroxypropyl)aniline,
(ac) 3-propionylamino-N-n-propyl-N-(γ-chloro-β-hydroxypropyl)aniline,
(ad) 3-n-butyrylamino-N-n-butyl-N-(γ-chloro-β-hydroxypropyl)aniline,
(ae) 3-(β-chloropropionylamino)-N-n-butyl-N-(γ-chloro-β-hydroxypropyl)aniline,
(af) 3-benzoylamino-N-ethyl-N-(γ-chloro-β-hydroxypropyl)aniline, and
(ag) 3-p-toluoylamino-N-methyl-N-(γ-chloro-β-hydroxypropyl)aniline when similar blue dyestuffs are obtained.

We claim:
1. A water-insoluble monoazo dyestuff of the formula:

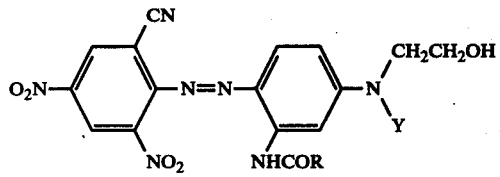

wherein R is selected from lower alkyl, chloro lower alkyl, tolyl and phenyl, and Y is lower alkyl.
2. A dyestuff as claimed in claim 1 wherein R is lower alkyl.